United States Patent
Ravuru et al.

(10) Patent No.: US 12,335,547 B2
(45) Date of Patent: Jun. 17, 2025

(54) CANDIDATE RANKING FOR CONTENT RECOMMENDATION

(71) Applicant: ROKU, INC., San Jose, CA (US)

(72) Inventors: Rakesh Ravuru, San Jose, CA (US); Abhishek Bambha, Burlingame, CA (US); Jing Lu, San Jose, CA (US); Zidong Wang, San Jose, CA (US); Jing Xie, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/965,176

(22) Filed: Oct. 13, 2022

(65) Prior Publication Data
US 2024/0129565 A1    Apr. 18, 2024

(51) Int. Cl.
*H04N 21/25* (2011.01)
(52) U.S. Cl.
CPC ................................ *H04N 21/251* (2013.01)
(58) Field of Classification Search
None
See application file for complete search history.

(56) References Cited

U.S. PATENT DOCUMENTS

| | | | |
|---|---|---|---|
| 10,373,176 B1 * | 8/2019 | Wei | H04N 21/26233 |
| 11,330,346 B1 * | 5/2022 | Duraiswamy | H04N 21/432 |
| 11,917,245 B2 * | 2/2024 | Phillips | G06N 20/00 |
| 2022/0310076 A1 | 9/2022 | Kumar et al. | |

OTHER PUBLICATIONS

Extended European Search Report directed to related European Application No. 23203571.7, mailed on Feb. 8, 2024, 9 pages.

* cited by examiner

*Primary Examiner* — Omar S Parra
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for candidate ranking for content recommendation. An embodiment operates by receiving category candidates over a network, wherein each of the category candidates comprises content candidates associated with one or more applications operating on media devices. The embodiment then ranks the category candidates based on a machine model trained using a learning algorithm based on the time series data, and ranks the content candidates in the each of category candidates based on the time series data. The embodiment then causes the ranked category candidates and the ranked content candidates to be outputted for display.

22 Claims, 5 Drawing Sheets

CANDIDATE RANKING FOR CONTENT RECOMMENDATION

BACKGROUND

Field

This disclosure is generally directed to content recommendation, and more particularly to candidate ranking for the content recommendation.

Background

Content, such as a movie or TV show, is typically displayed on a television or other display screen for watching by users. In order to provide the most relevant content to users, the content may be categorized by different themes in multiple rows. The multiple rows may be ranked and content candidates in each row may be ranked to provide an order for display to a user. For example, a plurality of videos (e.g., movies, TV shows, video clips, etc.) may be displayed to the user such that: multiple rows of content are displayed in an order to provide the row with the highest ranking at the top of the screen; and multiple content candidates in each row are displayed in an order to provide the content candidate with the highest ranking at the left of the screen.

One or more parameters, including for example, streaming time of one or more content candidates can be used for ranking the multiple rows and content candidates. However, there are various technological problems associated with this approach. First, streaming time of a content candidate may not be available in some user environments. For example, content candidates may be associated with multiple applications, and a streaming time of a content candidate may not be available in each of the multiple applications. Second, ranking the multiple rows and content candidates based on streaming time often results in inaccurate rankings. For example, ranking the multiple rows and content candidates using a machine learning model trained on streaming time often produces inaccurate rankings. Finally, ranking the multiple rows and content candidates based on streaming time is often computationally expensive. For example, ranking the multiple rows and content candidates based on streaming time often requires training the machine learning models that produce such rankings for significantly longer periods of time before they produce reasonably accurate rankings.

SUMMARY

Provided herein are system, apparatus, article of manufacture, method and/or computer program product embodiments, and/or combinations and sub-combinations thereof, for candidate ranking for content recommendation. Although some embodiments are discussed with respect to video (e.g., movie, TV show, video clip, etc.) recommendation, the embodiments of this disclosure are not limited to these examples and the embodiments of this disclosure can be used for other content recommendation such as audio recommendation, image recommendation, text recommendation, graphic recommendation, gaming application recommendation, advertisement recommendation, programming content recommendation, public service content recommendation, government content recommendation, local community content recommendation, software recommendation, or the like.

An example embodiment operates by a computer-implemented method for candidate ranking for content recommendation. The method includes receiving, by at least one computer processor, category candidates over a network, wherein each of the category candidates comprises content candidates associated with one or more applications operating on media devices. The method further includes receiving time series data associated with the content candidates, wherein the time series data comprises a time period of user interaction with one of the one or more applications in a session. The method further includes ranking the category candidates based on a machine learning model, wherein the machine learning model is trained using a learning algorithm based on the time series data. The method further includes ranking the content candidates in the each of category candidates based on the time series data. The method further includes causing the ranked category candidates and the ranked content candidates to be outputted for display.

In some embodiments, the learning algorithm can include a reinforcement learning algorithm that maximizes an objective function.

In some embodiments, the objective function can be a weighted function based on one or more parameters.

In some embodiments, the one or more parameters can comprise a number of user clicks, a number of content launches, the time series data, streaming time data, or a business target associated with the content candidates.

In some embodiments, the ranking the category candidates based on the machine learning model can include predicting the time series data using a machine learning mechanism. The ranking the category candidates based on the machine learning model can further include ranking the category candidates based on the predicted time series data.

In some embodiments, the ranking the content candidates in the each of category candidates can include predicting the time series data using a machine learning mechanism. The ranking the content candidates in the each of category candidates can include further ranking the content candidates in the each of category candidates based on the predicted time series data.

In some embodiments, after the ranking the category candidates, the method can further include modifying a rank of one of the ranked category candidates based on the time series data.

An example embodiment operates by a system that includes at least one processor configured to perform operations including receiving, by at least one computer processor, category candidates over a network, wherein each of the category candidates comprises content candidates associated with one or more applications operating on media devices. The operations can further include receiving time series data associated with the content candidates, wherein the time series data comprises a time period of user interaction with one of the one or more applications in a session. The operations can further include ranking the category candidates based on a machine learning model, wherein the machine learning model is trained using a learning algorithm based on the time series data. The operations can further include ranking the content candidates in the each of category candidates based on the time series data. The operations can further include causing the ranked category candidates and the ranked content candidates to be outputted for display.

In some embodiments, the learning algorithm can include a reinforcement learning algorithm that maximizes an objective function.

In some embodiments, the objective function can be a weighted function based on one or more parameters.

In some embodiments, the one or more parameters can comprise a number of user clicks, a number of content launches, the time series data, streaming time data, or a business target associated with the content candidates.

In some embodiments, the operation of the ranking the category candidates based on the machine learning model can include predicting the time series data using a machine learning mechanism. The ranking the category candidates based on the machine learning model can further include ranking the category candidates based on the predicted time series data.

In some embodiments, the operation of the ranking the content candidates in the each of category candidates can include predicting the time series data using a machine learning mechanism. The ranking the content candidates in the each of category candidates can include further ranking the content candidates in the each of category candidates based on the predicted time series data.

In some embodiments, after the ranking the category candidates, the operations can further include modifying a rank of one of the ranked category candidates based on the time series data.

An example embodiment operates by a non-transitory computer-readable medium having instructions stored thereon that, when executed by at least one computing device, cause the at least one computing device perform operations that include receiving, by at least one computer processor, category candidates over a network, wherein each of the category candidates comprises content candidates associated with one or more applications operating on media devices. The operations can further include receiving time series data associated with the content candidates, wherein the time series data comprises a time period of user interaction with one of the one or more applications in a session The operations can further include ranking the category candidates based on a machine learning model, wherein the machine learning model is trained using a learning algorithm based on the time series data. The operations can further include ranking the content candidates in the each of category candidates based on the time series data. The operations can further include causing the ranked category candidates and the ranked content candidates to be outputted for display.

In some embodiments, the learning algorithm can include a reinforcement learning algorithm that maximizes an objective function.

In some embodiments, the objective function can be a weighted function based on one or more parameters.

In some embodiments, the one or more parameters can comprise a number of user clicks, a number of content launches, the time series data, streaming time data, or a business target associated with the content candidates.

In some embodiments, the operation of the ranking the category candidates based on the machine learning model can include predicting the time series data using a machine learning mechanism. The ranking the category candidates based on the machine learning model can further include ranking the category candidates based on the predicted time series data.

In some embodiments, the operation of the ranking the content candidates in the each of category candidates can include predicting the time series data using a machine learning mechanism. The ranking the content candidates in the each of category candidates can include further ranking the content candidates in the each of category candidates based on the predicted time series data.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for candidate ranking for content recommendation.

Figure 1:
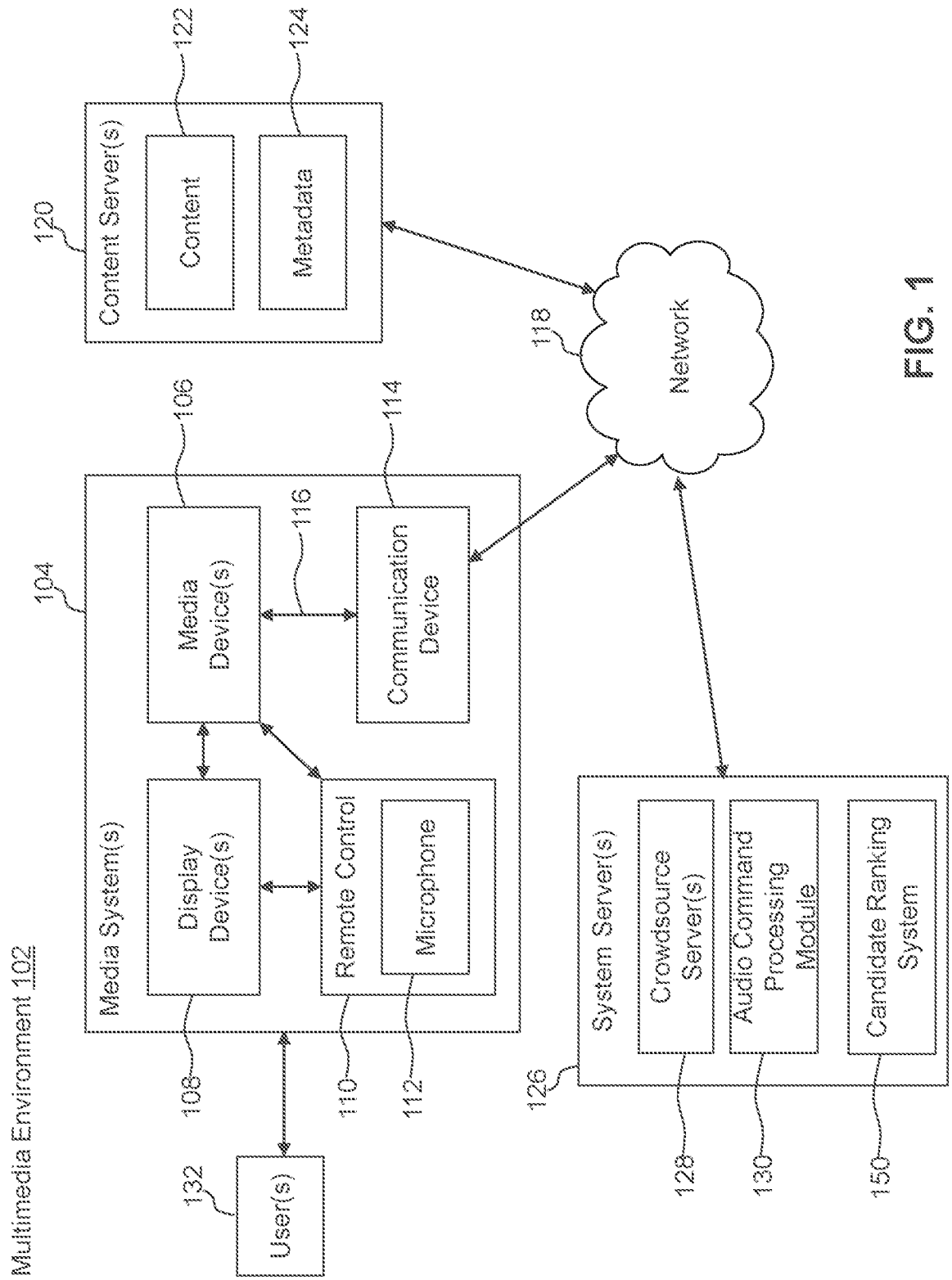
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
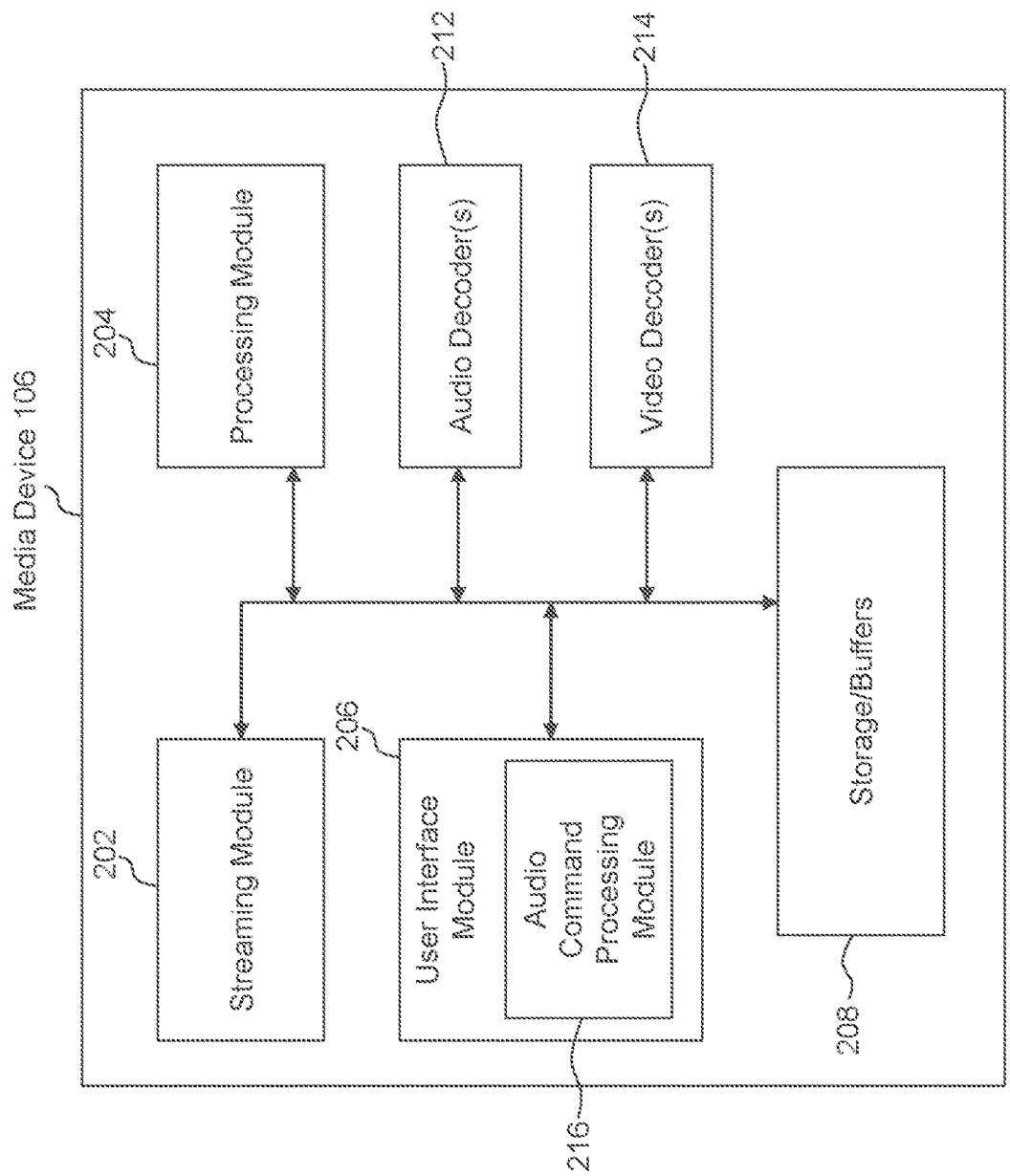
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

According to some embodiments, system servers 126 can include a candidate ranking system 150. As discussed in more detail below (for example, with respect to FIGS. 3 and 4), the candidate ranking system 150 can be configured to receive category candidates and content candidates. As discussed above, the content can include any combination of music, videos, movies, TV programs, multimedia, images, still pictures, text, graphics, gaming applications, advertisements, programming content, public service content, government content, local community content, software, and/or any other content or data objects in electronic form. The content candidate can include any candidate for the content to be provided to (e.g., be displayed to) a user. The content may be categorized by predetermined category candidates to indicate different themes, including for example, Drama, Horror, Action, Romance, Sci-Fi, Kids, Foreign, Live, Featured, Top 10, and Trending. In some embodiments, receiving the content candidates and the category candidates can include receiving a list (e.g., information associated with) the content candidates and the category candidates. In some embodiments, content candidates can be associated with one or more applications from one or more media devices (e.g., Media device 106) over a network (e.g., network 118).

According to some embodiments, the candidate ranking system 150 can be configured to receiving time series data comprising a time period of user interaction with one of the one or more applications in a session. In some embodiments, the candidate ranking system 150 can be configured to receiving content information associated with the one or more applications in the session based on, for example, metadata 124 of content 122 associated with one of the one or more applications in the session.

According to some embodiments, the candidate ranking system 150 can be configured to ranking the category candidates based on a machine learning model trained using a learning algorithm based on the time series data. According to some embodiments, the candidate ranking system 150 can be configured to ranking the content candidates in the each of category candidates based on the time series data. According to some embodiments, the candidate ranking system 150 can be configured to provide to (e.g., display to) the users 132 the ranked category candidates and the ranked content candidates. For example, the candidate ranking system 150 can display the ranked category candidates and the ranked content candidates using the media device 106 and/or the display devices 108.

Although the candidate ranking system 150 is illustrated in FIG. 1 as part of the system servers 126, the embodiments of this disclosure are not limited to this example. The candidate ranking system 150 can be part of the media systems 104. For example, the candidate ranking system 150 can be part of the media devices 106. Additionally, or alternatively, the candidate ranking system 150 can be part of the content servers 120. Additionally, or alternatively, the structural and functional aspects of the candidate ranking system 150 may wholly or partially exist in the same or different ones of the system servers 126. The structural and functional aspects of the candidate ranking system 150 may be decentralized between any combination of system servers 126, media devices 106, content servers 120, and the like.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select a content recommendation in an application, such as a movie recommendation in a streaming service application. The user 132 may spend a time period, for example a dwell time, in the application. For example, the time period of the dwell time may start when the user 132 clicks on the content recommendation in the application in a session. The time period of the dwell time may end when the user 132 exits the application in the session.

In some embodiments, content recommendation can include different categories and each of the different categories can be displayed as a row on the display device 108 to the user 132. In some embodiments, each category may indicate a theme, including for example, Drama, Horror, Action, Romance, Sci-Fi, Kids, Foreign, Live, Featured, Top 10, and Trending. One or more content candidates can be displayed in each row on the display device 108 to the user 132.

In some embodiments, after selecting the content recommendation, the user 132 may use the remote control 110 to interact with the user interface module 206 of the media device 106 to select a content candidate associated with the content recommendation, such as a movie, TV show, music, book, application, game, etc. The streaming module 202 of the media device 106 may request the selected content candidate from the content server(s) 120 over the network 118. The content server(s) 120 may transmit the requested content candidate to the streaming module 202. The media device 106 may transmit the received content candidate to the display device 108 for playback to the user 132.

In some embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Candidate Ranking for Content Recommendation

In some embodiments, system server 126 and/or the media device 106 operate to rank multiple rows and content candidates according to dwell time, thereby providing an improved personalized user experience.

As discussed above, One or more parameters, including for example, streaming time of one or more content candidates can be used for ranking the multiple rows and content candidates. However, there are various technological problems associated with this approach. First, streaming time of a content candidate may not be available in some user environments. For example, content candidates may be associated with multiple applications, and a streaming time of a content candidate may not be available in each of the multiple applications. Second, ranking the multiple rows and content candidates based on streaming time often results in inaccurate rankings. For example, ranking the multiple rows and content candidates using a machine learning model trained on streaming time often produces inaccurate rankings. Finally, ranking the multiple rows and content candidates based on streaming time is often computationally expensive. For example, ranking the multiple rows and content candidates based on streaming time often requires training the machine learning models that produce such rankings for significantly longer periods of time before they produce reasonably accurate rankings. Therefore, there is a need to improve the ranking of multiple rows and content candidates to provide a more relevant personalized user experience.

Embodiments herein solve these technological problems by ranking content candidates using a machine learning model trained using time series data (e.g., dwell time) from various media devices. For example, the machine learning model can be trained using a learning algorithm such as, but not limited to, a reinforcement learning algorithm that maximizes an objective function. The objective function can include a weighted function based on one or more parameters, including for example, a number of user clicks, a number of content launches, the time series data, streaming time data, or a business target associated with the content candidates.

In some embodiments, a system server 126 can be configured to provide content recommendation to user 132. The system server 126 can be configured to provide candidate ranking for the content recommendation. The system server 126 can be configured to receive one or more category candidates over a network. Each of the one or more category candidates can include one or more content candidates associated with one or more applications operating on the media device 106. In some embodiments, the system server 126 can be configured to receive time series data comprising a time period of user interaction with one of the one or more applications in a session, including for example, dwell time as discussed above.

According to some embodiments, the system server 126 can be configured to rank the category candidates based on a machine learning model trained using a learning algorithm based on the time series data. The system server 126 can be configured to rank the content candidates in the each of category candidates based on the time series data. According to some embodiments, the system server 126 can be configured to causing the ranked category candidates and the ranked content candidates to be outputted for display using the display device 108.

As discussed above, the candidate ranking for the content recommendation can be performed by the candidate ranking system 150 as part of the system server 126.

Figure 3:
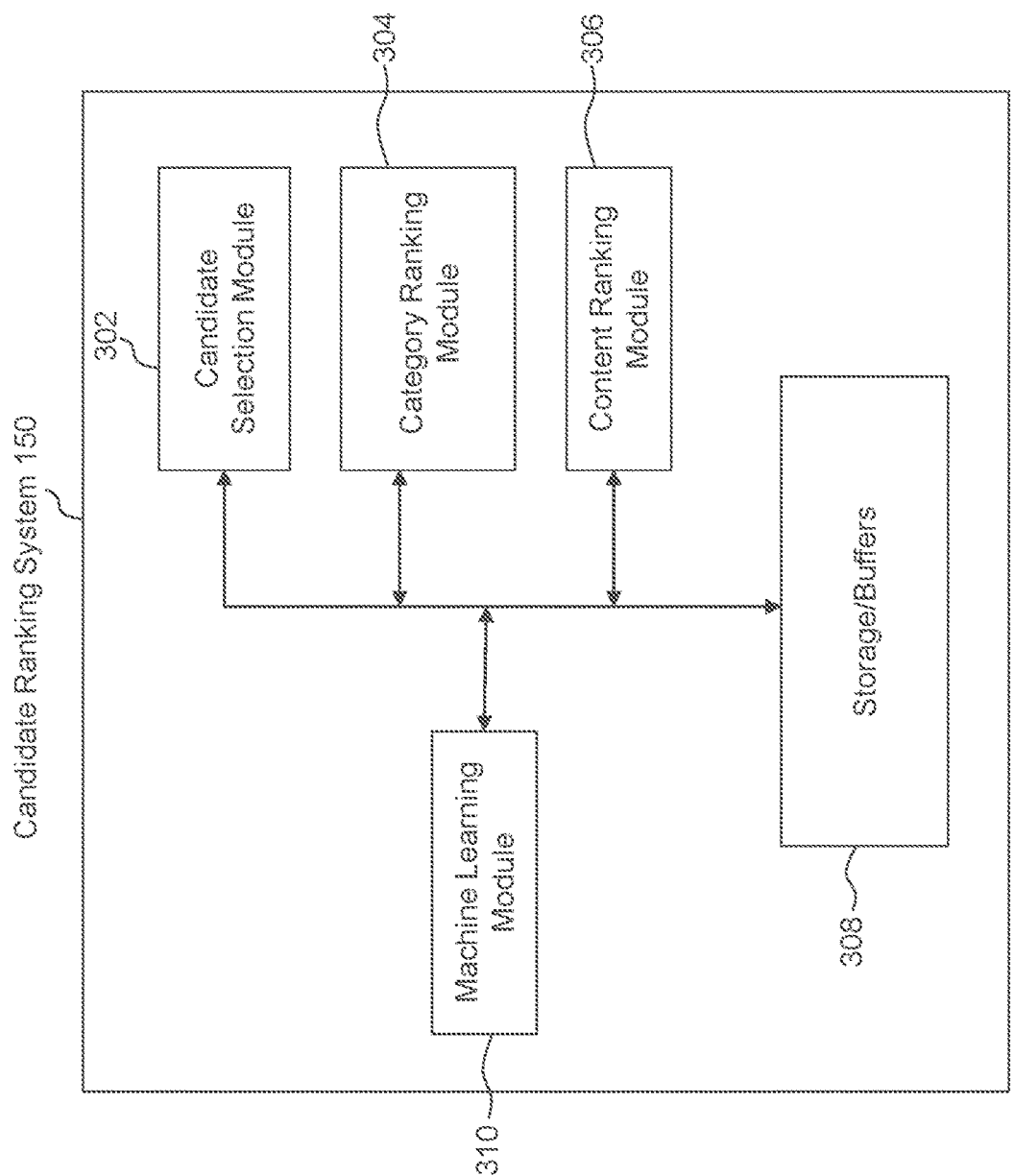
FIG. 3 illustrates a block diagram of a candidate ranking system, according to some embodiments.

FIG. 3 illustrates a block diagram of an example candidate ranking system 150, according to some embodiments. The candidate ranking system 150 can include a candidate selection module 302, a category ranking module 304, a content ranking module 306, storage/buffers 308, and a machine learning module 310. However, the embodiments of this disclosure are not limited to these systems/modules and the candidate ranking system 150 can include other systems/modules.

According to some embodiments, the candidate selection module 302 can have access to a plurality of content candidates. For example, the candidate selection module 302 can access the content servers 120 to retrieve the plurality of content candidates from different content servers 120. In some implementations, the content selection module 302 can be configured to select the plurality of content candidates based on one or more parameters, including for example, a popularity score associated to each one of the plurality of content candidates that the candidate selection module 302 can access. For example, each content candidate in the plurality of content candidates that the candidate selection module 302 can access has a popularity score. According to some embodiments, the popularity score can be determined for each content candidate based at least on any combination of a number of times the content candidate has been selected, a number of times the content candidate has been viewed, a number of times the content candidate has been searched for, a number of times the content candidate has been displayed to user, or the like.

Although the popularity score is discussed in some examples for the candidate selection module 302 to use to select the content candidates, the embodiments of this disclosure can use other parameters to select the content candidates. In a non-limiting example, the candidate selection module 302 can be configured to select about 400 to 2000 content candidates (e.g., N=400-2000). However, the embodiments of this disclosure are not limited to this example.

According to some embodiments, the popularity scores and/or other parameters can be stored in the storage/buffers 308. Additionally, or alternatively, the popularity scores and/or other parameters can be stored by the content servers 120, the system servers 126, and/or other systems within the multimedia environment 102. According to some embodiments, the popularity scores and/or other parameters can be determined and/or be updated using the machine learning (ML) module 310.

According to some embodiments, each of the content candidates can be associated with an application installed on the media device 106, such as for example, a streaming service application. The application can be associated with the content servers 120 to provide a user interaction with each of the content candidates, including for example, selecting a content recommendation of a content candidate, previewing the details (e.g., brief introduction or description) of the content candidate without selecting the content candidate for playback, selecting the content candidate for playback.

According to some embodiments, each of the content candidates can be categorized as one or more category candidates, based on metadata of the content candidates. In one example, each category candidate may indicate a theme, including for example, Drama, Horror, Action, Romance, Sci-Fi, Kids, Foreign, Live, Featured, Top 10, and Trending.

According to some embodiments, after selecting the content candidates, the category ranking module 304 can be configured to rank the category candidates. In some examples, the category ranking module 304 can be configured to rank the category candidates based on a category ranking score to optimize for an overall dwell time for a user associated with a category. As described above, the user 132 may spend a time period, for example a dwell time, in the application. For example, the time period of the dwell time may start when the user 132 clicks on the content recommendation in the application in a session. The time period of the dwell time may end when the user 132 exits the application in the session. In some examples, the category ranking score can be determined by one or more machine learning algorithms. In some examples, the one or more machine learning algorithms can include a reinforcement learning algorithm, using for example, Multi-Armed Bandit (MAB) model. MAB models are known to persons of skill in the art and will not be discussed in detail. In some examples, the one or more machine learning algorithms can include a Thompson sampling algorithm.

Additionally, or alternatively, the category ranking module 304 can be configured to rank the category candidates based on a category ranking score to optimize for a predicted overall dwell time for a user associated with a category. In some implementations, one or more machine learning algorithms can be used to predict a dwell time associated with a category for a user.

Although the category ranking score is discussed in some examples for the category ranking module 304 to rank the category candidates, the embodiments of this disclosure can use other parameters to rank the category candidates. According to some embodiments, the category ranking score and/or other parameters can be determined and/or be updated using the machine learning (ML) module 310.

In some embodiments, the category ranking module 304 can be configured to apply impression discount algorithms to the ranked category candidates. According to some implementations, the impression discount algorithms can be used to modify (e.g., remove or lower) a rank of one or more categories if the user has not interacted with those categories. In some examples, the impression discount algorithms can be applied to (or be used as) the one or more machine learning algorithms.

According to some embodiments, the one or more parameters used by the category ranking module 304 can be stored in storage/buffers 308. Additionally, or alternatively, the one or more parameters used by the category ranking module 304 can be stored by the content servers 120, the system servers 126, and/or other systems within the multimedia environment 102. According to some embodiments, the one or more parameters used by the category ranking module 304 can be determined and/or be updated using the ML module 310.

According to some embodiments, after ranking the category candidates, the content ranking module 306 can be configured to rank the content candidates in each category candidate. In some examples, the content ranking module 306 can be configured to rank the content candidates in each category based on a content ranking score associated to each content candidate based on an aggregated dwell time from one or more users.

Additionally, or alternatively, the content ranking module 306 can be configured to rank the content candidates, based on a content ranking score, to optimize for a predicted overall dwell time for a user associated with a content candidate. In some implementations, one or more machine learning algorithms can be used to predict the overall dwell time for the user associated with the content candidate.

Although the content ranking score is discussed in some examples for the content ranking module 306 to rank the content candidates, the embodiments of this disclosure can use other parameters to rank the content candidates. According to some embodiments, the content ranking score and/or other parameters can be determined and/or be updated using the machine learning (ML) module 310.

In some embodiments, the content ranking module 306 can be configured to apply impression discount algorithms to the ranked content candidates. According to some implementations, the impression discount algorithms can be used to modify (e.g., remove or lower) a rank of one or more contents if the user has not interacted with those contents. In some examples, the impression discount algorithms can be applied to (or be used as) the one or more machine learning algorithms.

According to some embodiments, the one or more parameters used by the content ranking module 306 can be stored in storage/buffers 308. Additionally, or alternatively, the one or more parameters used by the content ranking module 306 can be stored by the content servers 120, the system servers 126, and/or other systems within the multimedia environment 102. According to some embodiments, the one or more parameters used by the content ranking module 306 can be determined and/or be updated using the ML module 310.

According to some embodiments, the ML module 310 can include one or more supervised learning algorithm such as, but not limited to, regression, decision tree, random forest, logistic regression, or the like. The ML module 310 can include support-vector machines classifier (SVMs, or support-vector networks), such as but not limited to, Maximal Margin classifier, one-of or one-vs-all classifier, linear SVM, nonlinear classifier, support-vector clustering, multiclass SVM, transductive SVM, structured SVM, regression SVM, Bayesian SVM, or the like. The ML module 310 can include unsupervised learning algorithms, such as, but not limited to, apriori algorithm, K-means, or the like. The ML module 310 can include reinforcement learning algorithms, such as, but not limited to, Markov decision process or the like. The ML module 310 can include a Naïve Bayes classifier, which may apply Bayes theorem. However, the embodiments of this disclosure are not limited to these examples and other the ML module 310 can include other ML algorithms and/or other artificial intelligence (AI) algorithms.

According to some embodiments, the candidate ranking system 150 can use the user's feedback to the content recommendation to train and/or update the ML module 310. In some implementations, the candidate ranking system 150 can use the user's feedback to update one or more parameters used by the candidate selection module 302, the category ranking module 304 and the content ranking module 306. In some embodiments, the user's feedback to the content recommendation can include any combination of user's requesting an update to the content recommendation, user's selecting content candidates that the user had not selected before, user not selecting content candidates that the user had not selected before, user's selection of different content similar to the content candidates in the content selection, or the like.

According to some embodiments, the candidate selection module 302 and the category ranking module 304 can be combined. The category ranking module 304 can be configured to receive the category candidates or content candidates selected from the content servers 120 and/or remote device 106.

According to some embodiments, the candidate selection module 302 and the content ranking module 306 can be combined. The content ranking module 306 can be configured to receive the category candidates or content candidates selected from the content servers 120 and/or remote device 106.

Figure 4:
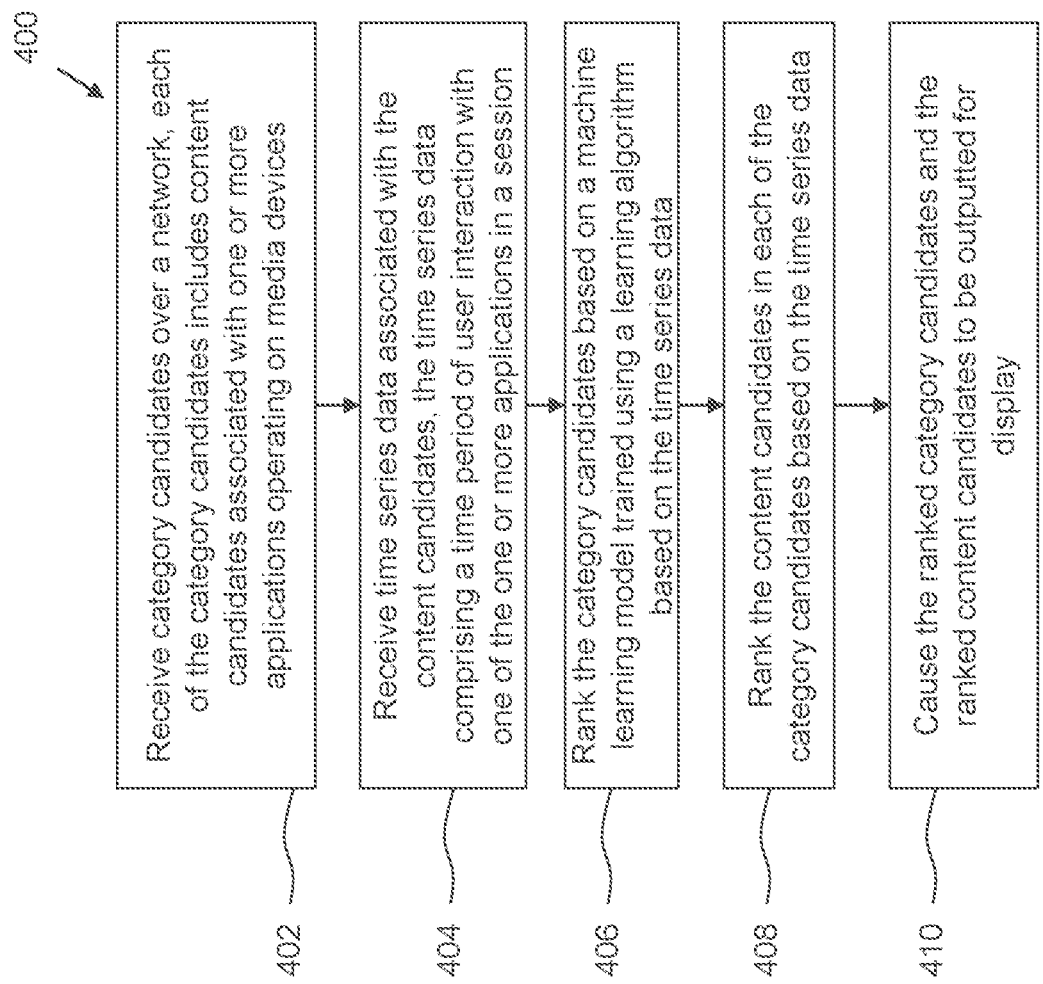
FIG. 4 is a flowchart illustrating a process for candidate ranking for content recommendation, according to some embodiments.

FIG. 4 is a flowchart for a method 400 for candidate ranking for content recommendation, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. For example, method 400 may represent the operation of a candidate ranking system (e.g., the candidate ranking system 150 of FIGS. 1 and 3) for content recommendation. However, method 400 is not limited to that example embodiment.

In step 402, the candidate ranking system 150 receives category candidates over a network d. Each of the category candidates includes content candidates associated with one or more applications operating on media devices. For example, the category ranking module 304 can be configured to receive content candidates from the candidate selection module 302, as discussed above. According to some embodiments, each of the content candidates can be associated with an application installed on the media device 106, as discussed above. According to some embodiments, each of the content candidates can be categorized as one or more category candidates, as discussed above. In one example, each category candidate may be predetermined to indicate a theme, including for example, Drama, Horror, Action, Romance, Sci-Fi, Kids, Foreign, Live, Featured, Top 10, and Trending.

In step 404, the candidate ranking system 150 receives time series data associated with the content candidates. The time series data include a time period of user interaction with one of the one or more applications in a session. For example, the category ranking module 304 can be configured to receive time series data associated with the content candidates from the media device 106 and/or the content servers 120. Alternatively or in additional, the content ranking module 306 can be configured to receive time series data associated with the content candidates from the media device 106 and/or the content servers 120.

According to some embodiments, each of the content candidates can be associated with an application installed on the media device 106, such as for example, a streaming service application. The application can be associated with the content servers 120 to provide a user interaction with each of the content candidates, including for example, selecting a content recommendation of a content candidate, previewing the details (e.g., brief introduction or description) of the content candidate without selecting the content candidate for playback, selecting the content candidate for playback. According to some embodiments, as described above, a user may spend a time period, for example a dwell time, in the application. For example, the time period of the dwell time may start when the user clicks on the content recommendation in the application in a session. The time period of the dwell time may end when the user exits the application in the session. In some examples, the time period of user interaction with one of the one or more applications in a session may be a dwell time in an application associated with a content candidate. In some examples, the time period of user interaction with one of the one or more applications in a session may be a streaming time in an application associated with a content candidate.

In step 406, the candidate ranking system 150 ranks the category candidates based on a machine learning model trained using a learning algorithm based on the time series data. For example, the category ranking module 304 can be configured to rank the category candidates based on a learning algorithm provided by the machine learning module 310.

In some examples, the learning algorithm can include a reinforcement learning algorithm, using for example, Multi-Armed Bandit (MAB) model. MAB models are known to persons of skill in the art and will not be discussed in detail. In some examples, the learning algorithm can include a Thompson sampling algorithm. According to some embodiments, an agent in the MAB model may select actions (e.g., arms) in order to maximize its cumulative reward in the long term. In some examples, each category candidate may be considered as an arm in the MAB model and represented by a Beta distribution with one or more parameters, such as Alpha and/or Beta, associated with the Thompson sampling algorithm. Alpha may be derived from user engagement and Beta may be derived from category impression. The mean and variance of the beta distribution can be determined by Alpha and Beta. The category ranking score (e.g., a ranking) of a category candidate may be sampled from the beta distribution and associated with the mean of the beta distribution.

In some examples, a reward function associated with the MAB model using Thompson sampling algorithm can be shown in equation (1) as below:

$$\text{reward function} = (w1*(\text{number of clicks}) + w2*(\text{number of launches}) + w3*(\text{streaming time or dwell time}) + w4*(\text{revenue}))/(\text{number of category impressions}) \quad (1)$$

In some examples, in equation (1), the parameter of "number of category impressions" may be associated with a number of user interaction with one category, such as for example, selecting a category candidate during content recommendation. The parameter of "number of clicks" may be associated with a number of clicks associated with content recommendation for content candidates in a category candidate. The parameter of "number of launches" may be associated with a number of launching content candidates in a category candidate. The parameter of "streaming time or dwell time" may be associated with a streaming time or dwell time associated with a content candidate in a category candidate. The parameter of "revenue" may be associated with a revenue associated with streaming the content candidates in a category candidate.

In some examples, in equation (1), the reward function can be a weighted function with each of w1, w2, w3 and w4 representing a weight for each of the parameters of "number of clicks", "number of launches", "streaming time or dwell time", "revenue", respectively.

For example, w1, w2, w3 and w4 may be different for different categories, such as regular content categories, Live, Kids and Featured categories, categories containing bookends, provider, bundle and unlocked categories, categories with multi-series content candidates, categories with direct license streaming content candidates. Alternatively or in addition, w1, w2, w3 and w4 may be different for different channels and/or different users. In some examples, a reward associated with the reward function in equation (1) can be computed and updated at a predetermined time interval, such as for example, every 4 hours.

According to some embodiments, the learning algorithm may start with an initial set of global level metrics to initialize the Beta distribution for each category. For example, data (e.g., category impression, streaming time) associated with a predetermined number of user who have impressions on a category in a category feature table can be collected as the initial set of global level metrics.

The implementations in the present application may provide advantages compared with traditional MAB with Thompson sampling algorithm in the following aspects:
1. Adaptability with most recent non-cumulative observations can be provided. Category performance changes and/or movements with a one day sliding window can be captured.
2. Continuous exploration with a partial convergence can be achieved. Sufficient index variability in all categories can be ensured so as to mitigate position bias. Both Alpha and Beta are auto scaled or discounted to maintain adequate variance of beta distribution.

Additionally, or alternatively, the category ranking module 304 can be configured to rank the category candidates based on a category ranking score to optimize for a predicted overall dwell time for a user associated with a category. In some implementations, one or more machine learning algorithms can be used to predict a dwell time associated with a category for a user, based dwell time spent by the user or different users.

In some embodiments, after the category candidates are ranked based on the machine learning model trained using the learning algorithm, impression discount algorithms to the ranked category candidates can be applied to modify (e.g., remove or lower) a rank of one or more categories if the user has not interacted with those categories. In some examples, the impression discount algorithms can be applied to (or be used as) to modify one or more weights in the weighted functions associated with the one or more machine learning algorithms.

In some embodiments, the candidate ranking system 150 may rank the category candidates based on one or more rule based models based on the time series data.

In step 408, the candidate ranking system 150 ranks the content candidates in each of the category candidates based on the time series data. For example, after ranking the category candidates, the content ranking module 306 can be configured to rank the content candidates in each category candidate. In some examples, the content ranking module 306 can be configured to rank the content candidates in each category based on a content ranking score associated to each content candidate based on an aggregated dwell time from one or more users. For example, the content ranking module 306 can be configured to rank the content candidates in each category associated to each content candidate based on an aggregated dwell time from a user on the content candidate and/or a similar content candidate. For example, the content ranking module 306 can be configured to rank the content candidates in each category associated to each content candidate based on an aggregated dwell time from different users on the content candidate and/or a similar content candidate.

Additionally, or alternatively, the content ranking module 306 can be configured to rank the content candidates, based on a content ranking score, to optimize for a predicted overall dwell time for a user associated with a content candidate. In some implementations, one or more machine learning algorithms can be used to predict the overall dwell time for the user associated with the content candidate.

In step 410, the candidate ranking system 150 causes the ranked category candidates and the ranked content candidates to be outputted for display. In some embodiments, the ranked category candidates and the ranked content candidates can be provided for display as content recommendation as "for you" or "featured" to a user. The ranked category candidates can be displayed as multiple rows in parallel in a vertical direction of the display device. The category with the highest ranking score may be displayed as the top row. The ranked content candidates in each row can be displayed as content recommendations adjacent to each other in a horizontal direction of the display device. The content candidate with the highest ranking score of each row may be displayed as the most left of each row.

Example Computer System

Figure 5:
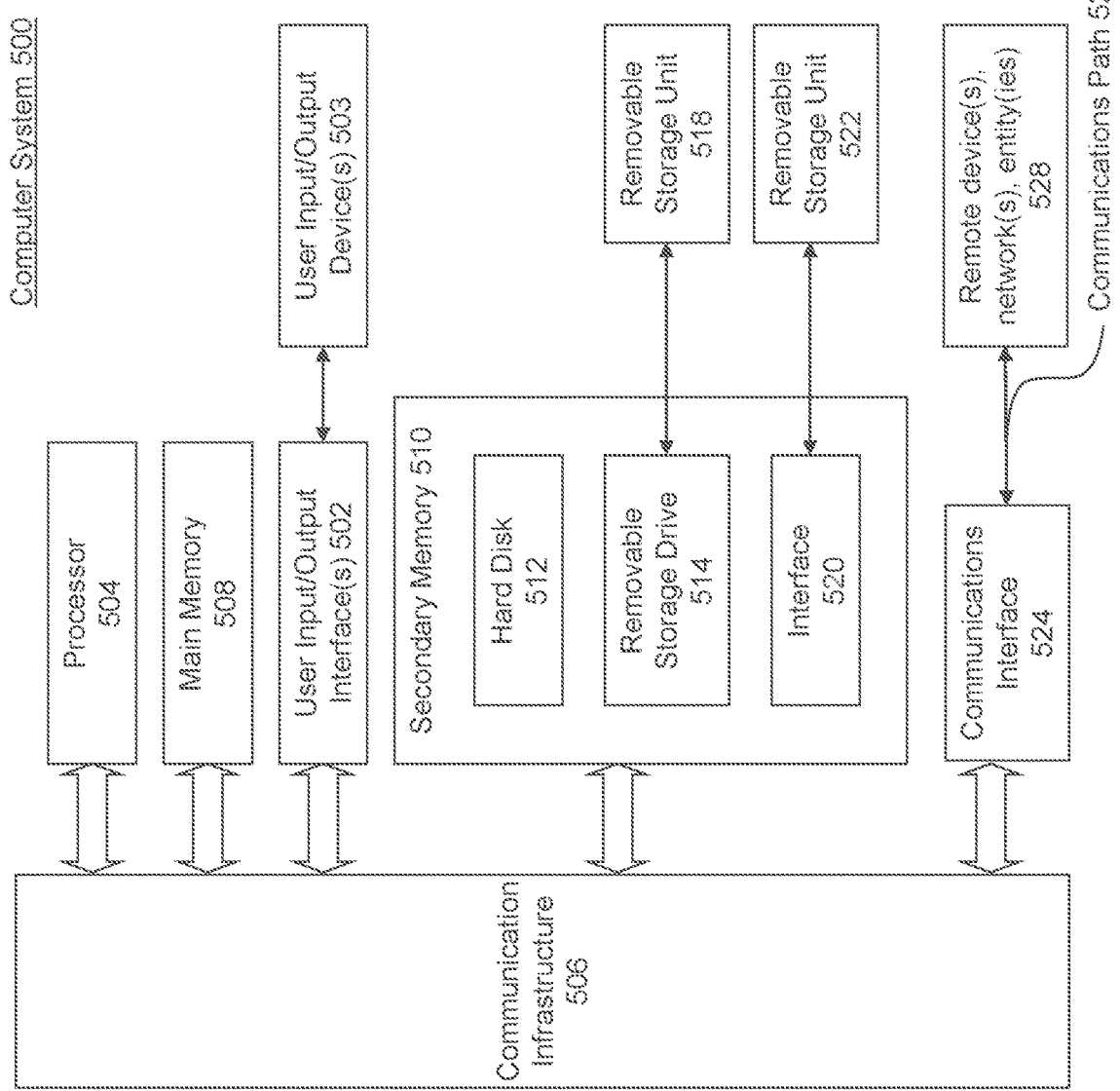
FIG. 5 illustrates an example computer system that can be used for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, the candidate ranking system 150 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for candidate ranking for content recommendation, the computer-implemented method comprising:

receiving, by at least one computer processor, category candidates over a network, wherein each of the category candidates comprises content candidates associated with one or more applications operating on media devices;

receiving time series data associated with the content candidates, wherein the time series data comprises a time period of user interaction with one of the one or more applications in a session;

ranking the category candidates based on a machine learning model, wherein the machine learning model is trained using a learning algorithm based on the time series data;

generating a popularity score for one or more of the content candidates, wherein the popularity score comprises a number of times a particular content candidate has been searched for;

ranking the content candidates in each of the category candidates based on the time series data and the popularity score;

causing the ranked category candidates and the ranked content candidates to be outputted for display;

receiving feedback indicating a subset of the ranked content candidates have not been interacted with by one or more users; and reducing the ranking of one or more of the subset of the ranked content candidates based on the feedback.

2. The computer-implemented method of claim 1, wherein the learning algorithm comprises a reinforcement learning algorithm that maximizes an objective function.

3. The computer-implemented method of claim 2, wherein the objective function is a weighted function based on one or more parameters.

4. The computer-implemented method of claim 3, wherein the one or more parameters comprise a number of user clicks, a number of content launches, the time series data, streaming time data, or a business target associated with the content candidates.

5. The computer-implemented method of claim 1, wherein the ranking the category candidates based on the machine learning model comprises:
predicting the time series data using a machine learning mechanism; and
ranking the category candidates based on the predicted time series data.

6. The computer-implemented method of claim 5, wherein the predicted time series data comprises a dwell time, wherein the predicted dwell time is based on a time spent accessing one or more of the content candidates by one or more different users.

7. The computer-implemented method of claim 1, wherein the ranking the content candidates in the each of the category candidates comprises:
predicting the time series data using a machine learning mechanism; and
ranking the content candidates in the each of the category candidates based on the predicted time series data.

8. The computer-implemented method of claim 1, further comprising:
after the ranking the category candidates, modifying a rank of one of the ranked category candidates based on the time series data.

9. The computer-implemented method of claim 1, wherein the ranking is based at least in part on a revenue associated with streaming each of the content candidates.

10. A computing system for candidate ranking for content recommendation, comprising:
one or more memories; and
at least one processor each coupled to at least one of the memories and configured to perform operations comprising:
receiving category candidates over a network, wherein each of the category candidates comprises content candidates associated with one or more applications operating on media devices;
receiving time series data associated with the content candidates, wherein the time series data comprises a time period of user interaction with one of the one or more applications in a session;
ranking the category candidates based on a machine learning model, wherein the machine learning model is trained using a learning algorithm based on the time series data;
generating a popularity score for one or more of the content candidates, wherein the popularity score comprises a number of times a particular content candidate has been searched for;
ranking the content candidates in each of the category candidates based on the time series data and the popularity score;
causing the ranked category candidates and the ranked content candidates to be outputted for display;
receiving feedback indicating a subset of the ranked content candidates have not been interacted with by one or more users; and
reducing the ranking of one or more of the subset of the ranked content candidates based on the feedback.

11. The computing system of claim 10, wherein the learning algorithm comprises a reinforcement learning algorithm that maximizes an objective function.

12. The computing system of claim 11, wherein the objective function is a weighted function based on one or more parameters.

13. The computing system of claim 12, wherein the one or more parameters comprise a number of user clicks, a number of content launches, the time series data, streaming time data, or a business target associated with the content candidates.

14. The computing system of claim 10, wherein the operation of the ranking the category candidates based on the machine learning model comprises:
predicting the time series data using a machine learning mechanism; and
ranking the category candidates based on the predicted time series data.

15. The computing system of claim 10, wherein the operation of the ranking the content candidates in the each of the category candidates comprises:
predicting the time series data using a machine learning mechanism; and
ranking the content candidates in the each of the category candidates based on the predicted time series data.

16. The computing system of claim 10, further comprising:
after the ranking the category candidates, modifying a rank of one of the ranked category candidates based on the time series data.

17. A non-transitory computer-readable medium having instructions stored thereon that, when executed by at least one computing device, cause the at least one computing device to perform operations comprising:
receiving category candidates over a network, wherein each of the category candidates comprises content candidates associated with one or more applications operating on media devices;
receiving time series data associated with the content candidates, wherein the time series data comprises a time period of user interaction with one of the one or more applications in a session;
ranking the category candidates based on a machine learning model, wherein the machine learning model is trained using a learning algorithm based on the time series data;
generating a popularity score for one or more of the content candidates, wherein the popularity score comprises a number of times a particular content candidate has been searched for;
ranking the content candidates in each of the category candidates based on the time series data and the popularity score;
causing the ranked category candidates and the ranked content candidates to be outputted for display;

receiving feedback indicating a subset of the ranked content candidates have not been interacted with by one or more users; and reducing the ranking of one or more of the subset of the ranked content candidates based on the feedback.

18. The non-transitory computer-readable medium of claim 17, wherein the learning algorithm comprises a reinforcement learning algorithm that maximizes an objective function.

19. The non-transitory computer-readable medium of claim 18, wherein the objective function is a weighted function based on one or more parameters.

20. The non-transitory computer-readable medium of claim 19, wherein the one or more parameters comprise a number of user clicks, a number of content launches, the time series data, streaming time data, or a business target associated with the content candidates.

21. The non-transitory computer-readable medium of claim 17, wherein the operation of the ranking the category candidates based on the machine learning model comprises:

predicting the time series data using a machine learning mechanism; and ranking the category candidates based on the predicted time series data.

22. The non-transitory computer-readable medium of claim 17, wherein the operation of the ranking the content candidates in the each of the category candidates comprises:

predicting the time series data using a machine learning mechanism; and ranking the content candidates in the each of the category candidates based on the predicted time series data.

* * * * *